(12) United States Patent
Schneider et al.

(10) Patent No.: US 9,979,997 B2
(45) Date of Patent: May 22, 2018

(54) SYNCHRONIZATION OF LIVE AUDIO AND VIDEO DATA STREAMS

(71) Applicant: International Business Machines Corporation, Armonk, NY (US)

(72) Inventors: Scott E. Schneider, Rolesville, NC (US); James J. Sliwa, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 139 days.

(21) Appl. No.: 14/882,605

(22) Filed: Oct. 14, 2015

(65) Prior Publication Data

US 2017/0111680 A1    Apr. 20, 2017

(51) Int. Cl.

| | | |
|---|---|---|
| *H04N 21/43* | (2011.01) | |
| *H04N 21/2187* | (2011.01) | |
| *H04N 21/4788* | (2011.01) | |
| *H04N 21/81* | (2011.01) | |
| *H04N 21/458* | (2011.01) | |
| *H04N 21/8547* | (2011.01) | |
| *H04N 21/485* | (2011.01) | |

(52) U.S. Cl.
CPC ..... *H04N 21/4307* (2013.01); *H04N 21/2187* (2013.01); *H04N 21/458* (2013.01); *H04N 21/4788* (2013.01); *H04N 21/4852* (2013.01); *H04N 21/8106* (2013.01); *H04N 21/8547* (2013.01)

(58) Field of Classification Search
CPC .. H04N 5/04; H04N 5/05; H04N 5/06; H04N 5/067; H04N 5/0675; H04N 5/073; H04N 5/0733; H04N 5/0736; H04N 5/08; H04N 5/10; H04N 5/12; H04N 5/123; H04N 5/126; G06K 9/00765; G11B 27/031
See application file for complete search history.

(56) References Cited

U.S. PATENT DOCUMENTS

| | | |
|---|---|---|
| 4,847,698 A | 7/1989 | Freeman |
| 8,046,792 B2 | 10/2011 | Seidel et al. |
| 8,111,326 B1 | 2/2012 | Talwar |

(Continued)

FOREIGN PATENT DOCUMENTS

CN    102364952 A    2/2012

*Primary Examiner* — Benjamin R Bruckart
*Assistant Examiner* — Anthony Bantamoi
(74) *Attorney, Agent, or Firm* — L. Jeffrey Kelly

(57) ABSTRACT

Embodiments of the present invention disclose a method, computer program product, and system for audio and video synchronization. A plurality of audio and video data streams are received on a computer system through a network. Selected audio and video are synchronized, in response to receiving a user selection input of based on the received plurality of audio data streams and the received plurality of video data streams. The synchronized audio and video is monitored periodically. The synchronized audio and video streams are indexed in a data store, based on a synchronization determination of the monitored audio and video data streams. In response to an error in the monitored synchronization, a time delay value option is communicated, to a computing device, through the network, for display. A time delay value is received, based on a user input. A second synchronization based on the received time delay value is performed.

17 Claims, 3 Drawing Sheets

(56) References Cited

U.S. PATENT DOCUMENTS

| | | | |
|---|---|---|---|
| 8,341,662 B1 | 12/2012 | Bassett et al. | |
| 2006/0013565 A1* | 1/2006 | Baumgartner | H04N 5/04 |
| | | | 386/201 |
| 2006/0156374 A1 | 7/2006 | Hu et al. | |
| 2009/0013086 A1 | 1/2009 | Greenbaum | |
| 2009/0094520 A1* | 4/2009 | Kulas | G06F 17/30056 |
| | | | 715/723 |
| 2010/0178036 A1* | 7/2010 | Heinmiller | G11B 27/10 |
| | | | 386/239 |
| 2012/0265859 A1* | 10/2012 | Zohar | G11B 27/10 |
| | | | 709/219 |
| 2013/0121662 A1 | 5/2013 | Moorer | |
| 2013/0311298 A1 | 11/2013 | Ayoub | |

\* cited by examiner

SYNCHRONIZATION OF LIVE AUDIO AND VIDEO DATA STREAMS

BACKGROUND

The present invention relates generally to the field of multimedia synchronization, and more particularly to synchronization of live audio sources to a live video source.

The synchronization of the audio and visual aspects of media are paramount to the experience of a user. Audio and video, or AV, that is not synchronized, or not in "synch," may compromise a consumer's experience and may be perceived as low quality production. Prerecorded AV and hardcoded live AV channels have established synchronization methods, where multiple data streams may be presented, for example, a user may select different audio channels for a television program, or a commentary track on a DVD.

Broadcasting has increasingly been moving out of the television space and moving to online forums broadcast over a communications network or the Internet. It is common for both Television and online hosts to have live events. Increasingly online events are held live. This is especially prevalent in eSports. It would therefore be advantageous to provide a method for users to engage with an online social community to provide various audio streams for a particular video stream.

SUMMARY

Embodiments of the present invention disclose a method, computer program product, and system for audio and video synchronization. In various embodiments, a plurality of audio and video data streams are received on a computer system through a network. Selected video data stream of the received plurality of video data streams and a selected audio data stream of the received plurality of audio streams are synchronized, in response to receiving a user selection input of based on the received plurality of audio data streams and the received plurality of video data streams. The synchronized video data stream and audio data stream are monitored and the monitoring occurring periodically. The synchronized video data stream and audio data stream are indexed in a data store, based on a synchronization determination of the monitored audio and video data streams. In response to an error in the monitored synchronization, a time delay value option is communicated, to a computing device through the network, for display. A time delay value is received, based on a user input selection of the time delay value option. A second synchronization based on the received time delay value is performed.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

DETAILED DESCRIPTION

Figure 1:
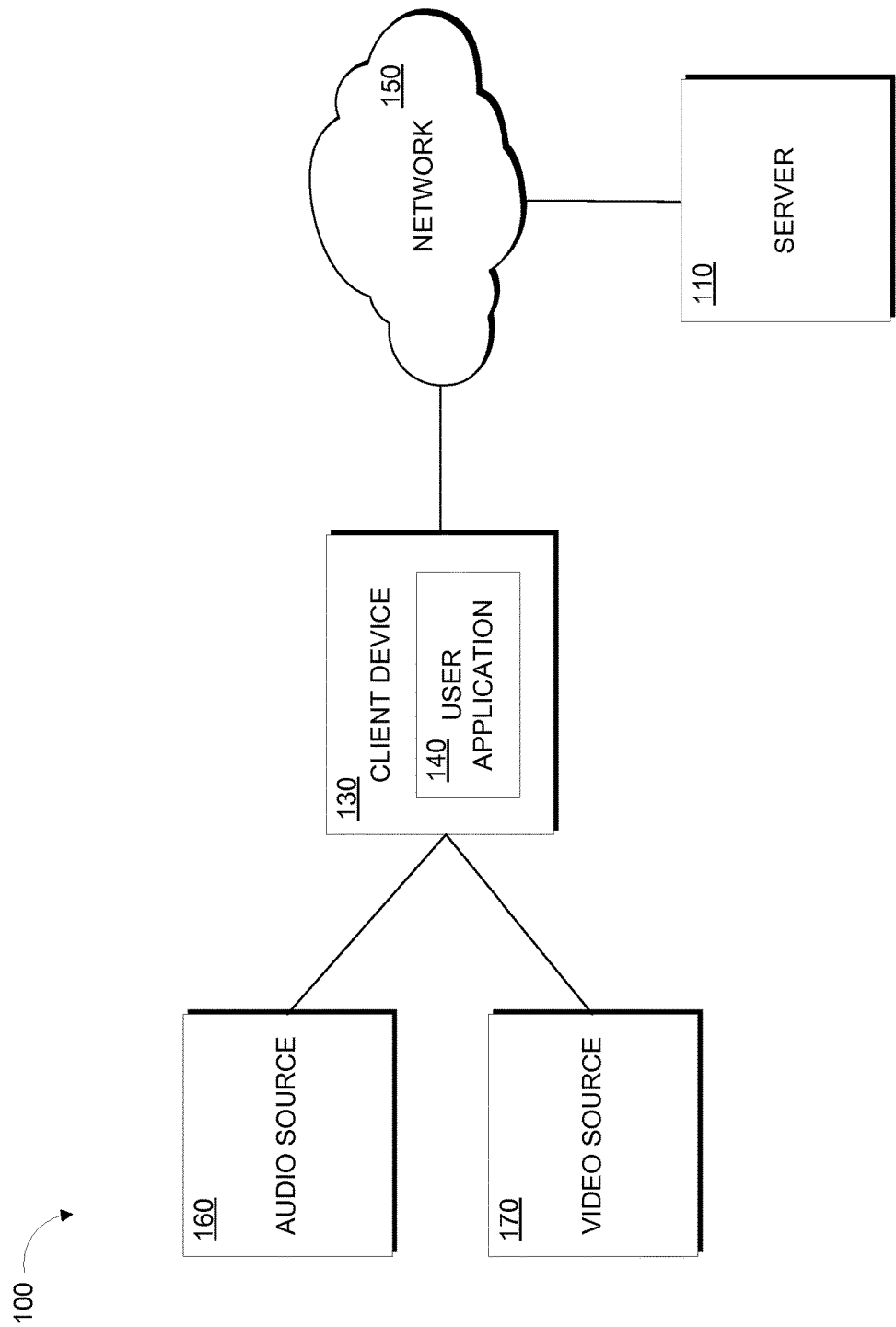
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Traditional AV media utilize various techniques in order to synchronize the audio and video content of the broadcast, for example, MPEG Decoding Time Stamps, audio wave common event analysis, or late-binding audio techniques. The expansion of online features for streaming media allow for a provider to offer multiple audio data streams, or channels, for a user to choose. However the video provider may not be able to provide all audio desired by a user and a user may obtain an alternative audio source. This may cause issues with synchronization as the audio is not timed or monitored by the video provider. For example, if a TV station is airing a baseball game, the user may obtain an alternative audio commentary to the game, for example, from the radio, internet, mobile device, etc., and the video and the audio may not be properly synchronized.

Some users may belong to online communities that can provide audio commentary as audio data streams for various events, however differences in network connectivity, bandwidth limitations, Internet Service Provider (ISP), etc. may cause the received audio stream and the video, whether over-the-air broadcast or data stream, to be out of synch. Embodiments of the present method and system can be advantageous in providing synchronization of a user's desired audio source with the video source the user is already consuming.

For example, a baseball fan may belong to a MLB fantasy league group on a social media website. While watching a live television broadcast of a game, the user may receive an electronic message containing a hyperlink to an audio stream of commentary focused on player statists, from another member of the social media group. This alternative commentary may be desirable, as opposed to, the general game commentary provided by the television broadcast. However, use of the alternative commentary may be untenable if the alternative commentary is out of synch with the television broadcast. Various embodiments of the present invention may allow a user to utilize audio from various sources and synch to video of another source, providing time stamp synchronization, common sound synchronization, and/or time delays to the user.

Embodiments of the present invention will be described with reference to the Figures. Referring to FIG. 1, a general distributed data processing environment 100 in accordance with one embodiment of the present invention is shown. Distributed data processing environment 100 includes server 110, client device 130, audio source 160, and video source 170 all interconnected over network 150.

Network 150 may include permanent connections, such as wire or fiber optic cables, or temporary connections made through telephone or wireless communications. Network 150 may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 150 may also include a number of different types of networks, such as, for example, an intranet, a local area network (LAN), or a wide area network (WAN).

Figure 3:
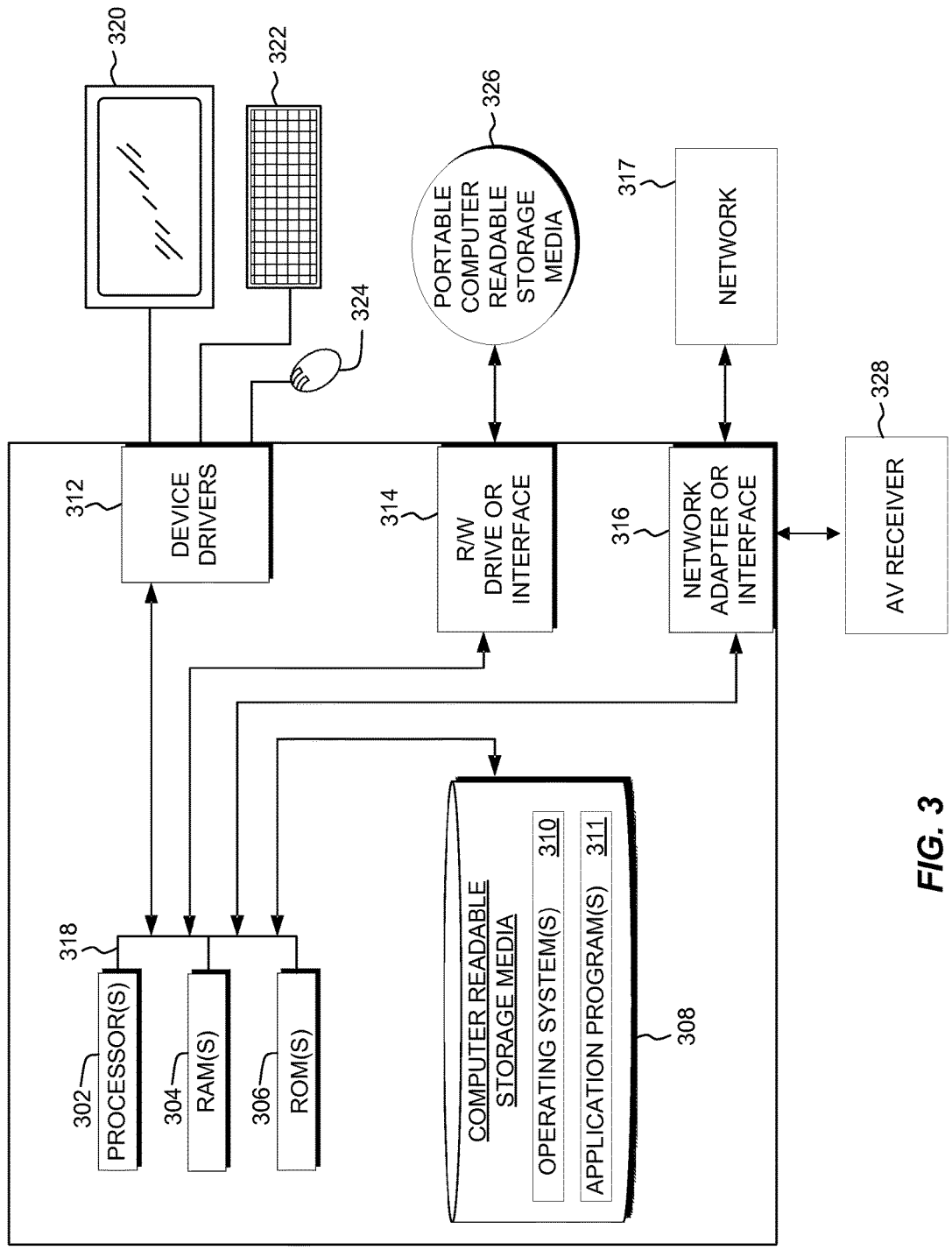
FIG. 3 depicts a block diagram of components of the proxy server computer executing the intelligent mapping program, in accordance with an embodiment of the present invention.

Each of server 110, client device 130, audio source 160, and video source 170 may be a laptop computer, tablet computer, netbook computer, personal computer (PC), a desktop computer, a smart phone, or any programmable electronic device capable of an exchange of data packets with other electronic devices, for example, through a network adapter, in accordance with an embodiment of the invention, and which may be described generally with respect to FIG. 3. In various embodiments, audio source 160 and video source 170 may any source or signal generator capable of transmission to an audio-video (AV) receiver, where client device 130, may contain an audio video receiver such as AV receiver 328 (FIG. 3). AV receiver 328 may be, for example, a satellite receiver, television antenna, or cable box that receives signals and provides corresponding video and audio to one or more components of client device 130. In various embodiments, server 110 may be a separate server or series of servers, a database, or other data storage, internal or external to client device 130.

Client device 130 may act generally to host an application, for example, user application 140. In various embodiments, client device 130 may act generally to receive a video and audio signal or stream, receive input from a user, communicate user input to user application 140, for further processing, and communicate with server 110 over network 150.

User application 140 may be, for example, database oriented, computation oriented, or a combination of these. User application 140 may operate generally to receive input from a user, display data in a graphical user interface, or GUI, or communicate over a network, for example network 150, via, for example an application window or web browser. User application 140 may communicate data with server 110 over network 150 via client device 130. User application 140 may receive user input, generate time delay values, receive audio and video signals or data streams from a source, for example, audio source 160 and video source 170, and communicate audio and video data streams to server 110, via network 150, for AV synchronization.

In various embodiments of the invention, user application 140 may display an interactive tool to the user via a GUI on client device 130. User application 140 may receive input from the use that may select a video stream received from video source 170. For example, a use may access user application 140 and user application 140 may display via a GUI available baseball games from the MBL network, live or prerecorded. In response to the received input selection user of a video stream, for example "Yankees v Dodgers 8 pm Live," user application 149 may receive metadata indicating a default associated audio stream that is prerecorded or hardcoded, and display the video stream and audio stream from the MLB network. These AV streams may be synchronized using traditional techniques by the provider.

It may be advantageous to allow the user to select an alternative audio stream. In various embodiments of the invention, user application 140 may receive a plurality of audio streams from over the air or digital data streams. For example a plurality of users (not shown) may access user application 140 via network 150 and provide audio streams associated with the respective user accounts. The audio streams may contain metadata providing labels indicating the type of the audio stream, or author, for example, "YankeeFan123 Commentary for tonight's game" or "John Smith's Commentary for MBL network Live at 8 pm." User application 140 may receive a user input selection for an audio stream for an audio stream not native to the video stream.

In an embodiment user application 140 may communicate the audio stream and video stream selected by the user to server 110 for synchronization, as described below. If the audio and video is not in synch, user application 140 may provide a selectable time delay option via a display in a GUI, generate a time delay value based on the user selection to server 110. Server 110 may change the timing of the playback rates of the video stream or audio stream based on the received time delay value.

For example, if the user is watching a live baseball game and selects John Smith's Commentary for MLB network Live at 8 pm, differences in location, bandwidth, computer resources, etc. may cause the user's video to be out of synch with the selected audio stream. Server 110 may use traditional synchronization techniques to synchronize the audio and video streams. Server 110 may periodically resynchronize the received audio and video streams. In various embodiments, the user may choose an over-the-air audio stream. Client device 130 may include an AV receiver, for example, AV receiver 328 (FIG. 3), to receive over-the-air broadcast and convert to a digital audio stream using traditional techniques, allowing for communication to, server 110. In response to an over-the-air audio stream selection, user application 140 may display a time delay value option so the user can select a delay value in increase or decrease the video playback rate in order to synchronize the audio stream and video stream manually.

The user may make a selection through clicking an input device, for example, a mouse, or any appropriate manner of gestures, touches, combined keys, or any other means of interactive input with client device 130.

In various embodiments, server 110 operates generally to receive inputs, receive and process a plurality of audio and video streams, synchronize received audio and video streams, and maintain audio and video synchronization. Server 110 may receive an audio stream and video stream from user application 140 via client device 130. Server 110 may synchronize the received audio and video streams using various techniques, for example, MPEG Decoding Time Stamps, audio wave common event analysis, late-binding audio, or input delay values received via client device 130.

In various embodiments, server 110 may index and store the synchronization timing of a first received audio and video streams. Server 110 may query the index in response to receiving a second audio and video stream and synchronized the second received audio and video streams based on the timing and technique of the first received audio and video stream. In various embodiments server 110 may communicate indexed synchronizations to client device 130 for display. For example, Joe may access user application 140, via client device 130, and select Game 1 and Commentary 3, where Game 1 is the video stream and Commentary 3 is an audio stream not native or previously synchronized with Game 1. Server 110 may receive Game 1 and Commentary 3, synchronize the audio and video streams, and index the synchronization in a data store. Mary may access user application 140, via client device 130, and select Game 1 and Commentary 3 as well. Server 110 may query the index of synchronizations and use the stored timing and synchronization data to synchronize Game 1 and Commentary 3 again.

The index may be advantageous if user application 140 receives delay input values from a plurality of users. For example if Commentary 3 in the previous example was an over the air radio broadcast and server 110 received a time delay input from Joe via client device 130, when Mary selects the same audio stream, user application 140 may query server 110 for the indexed synchronization, which includes the time delay value, and server 110 would synchronize Game 1 and Commentary 3 without the need for Mary to input a time delay value via client device 130.

Figure 2:
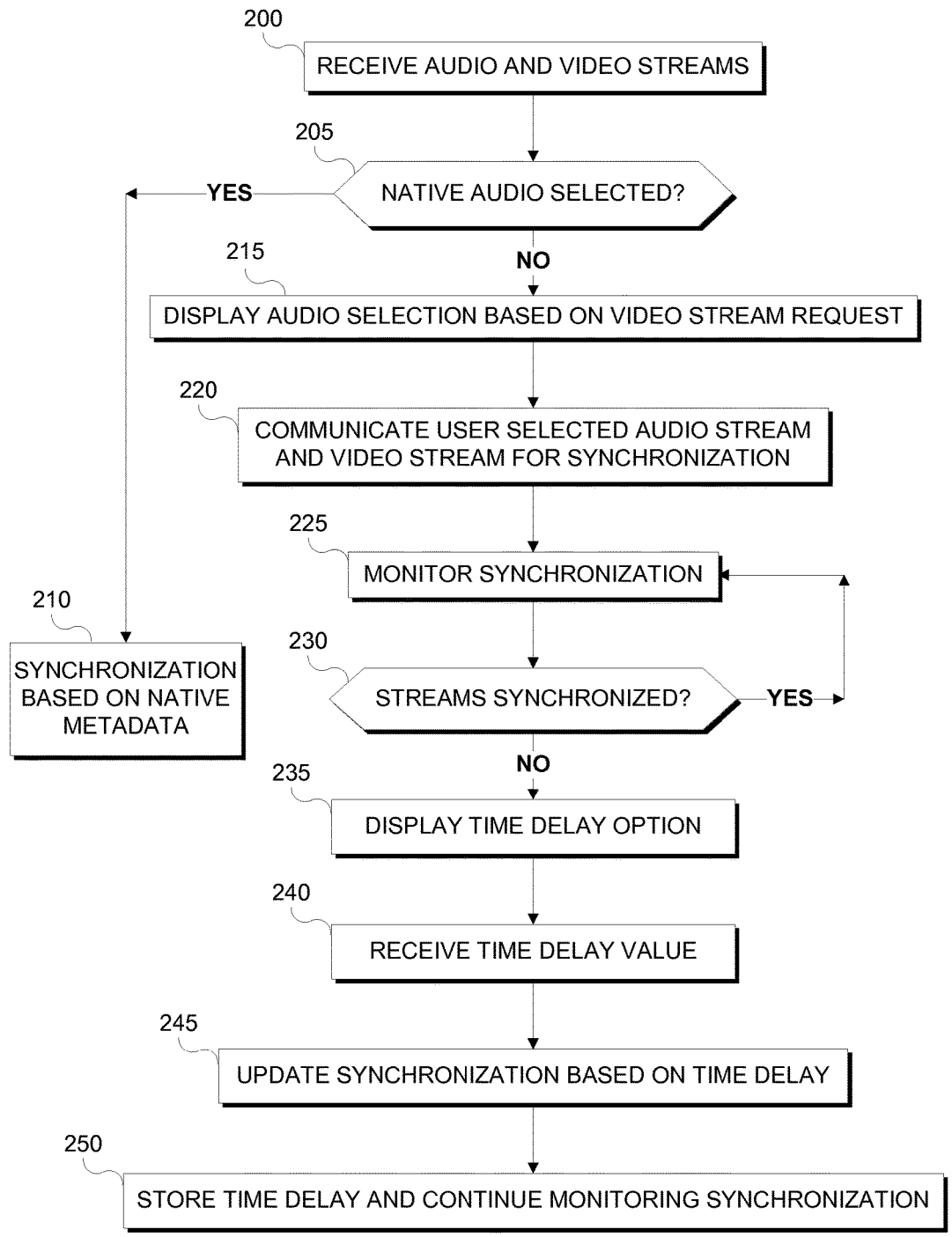
FIG. 2 is a flowchart depicting operational steps of a synchronization application, on a computing device within the data processing environment of FIG. 1, in accordance with an embodiment of the present invention.

Referring to FIG. 2, a method according to an embodiment of the invention, depicts operational steps of user application 140 running on client device 130, within the data processing environment of FIG. 1, for receiving and synchronizing audio and video streams. Referring to FIGS. 1 and 2, in step 200, user application 140 receives audio and video streams via client device 130. If the user selects the audio stream native to the video stream, in decision step 205 "YES" branch, user application 140 communicates the audio and video stream to server 110 and server 110 maintains synchronization using the native metadata, in step 210. If the user selects an audio stream not native to the received video stream, in decision step 205 "NO" branch, then, in step 215, user application 140 displays received audio streams as selectable options in a GUI.

In step 220, user application 140 communicates the received audio stream, in response to a user selection of an audio stream not native to the received video stream, and video stream to server 110 for synchronization. Server 110 synchronizes the received audio and video streams and periodically monitors the streams for synchronization, in step 225. If the audio and video streams are in synch, in decision step 230 "YES" branch, server 110 will continue to periodically monitor the synchronization of the audio and video streams. If the audio and video streams are not in synch, decision step 230 "NO" branch, user application 140 communicates a time delay option for display via client device 130, for user selection, in step 235.

In step 240, user application 140 receives a time delay value, in response to client device 130 receiving a user input selecting a time delay value from a displayed option of step 235. Client device 130 communicates the time delay to server 110 to update the synchronization based on the time delay, in step 245. In various embodiments, the time delay value may delay the audio stream or video stream by a count of seconds based on the selection input received by user application 140 via client device 130. In step 250, server 110 resynchronizes the audio and video streams based on the received time delay value, and stores the synchronization settings and associated time delay value, in an index in memory, for use in subsequent synchronizations.

In various embodiments, sever 110 may receive video data stream with an associated native audio data stream, receive a selected audio data stream, and synchronize the received video data stream and selected audio data stream using the native audio data stream, using various techniques. For example, server 110 may receive a video data stream for a sports event, along with the native commentary associated with that broadcast. Server 110 may receive an additional audio data stream in response to a user selected audio data stream via client device 130. Server 110 may analyze the native audio data stream and selected audio data stream for time stamps and synchronize the video data stream and selected audio data stream by matching the time stamps of the native audio data stream and selected audio data stream.

In various embodiments, common sound waveform analysis may also be utilized by sever 110 to match the native audio data stream and selected audio data stream. Server 110 may record received native audio data streams and selected audio data streams in a data store, analyze the recorded streams for common waveforms and synchronize the native audio data stream and selected audio data stream. Server 110 may synchronize the video data stream and selected audio data stream based on the synchronized native audio data stream and selected audio data stream.

In various embodiments, server 110 synchronize received audio and video streams by record and delayed playback. The delayed playback may be based on a received time delay value or a determination by server 110 based on a time stamp or common waveform analysis. Server 110 may delay playback of the selected audio data stream, based on a determination that the selected audio is ahead of the received video data stream, or server 110 may delay playback of the video data stream, based on a determination that the selected audio data stream is behind the received video data stream. The determination may be based on the synchronization techniques described above.

Referring to FIG. 3, components of server 110 and client device 130 of distributed data processing environment 100, of FIG. 1, are sown and in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Server 110 and client device 130 may include one or more processors 302, one or more computer-readable RAMs 304, one or more computer-readable ROMs 306, one or more computer readable storage media 308, device drivers 312, read/write drive or interface 314, network adapter or interface 316, all interconnected over a communications fabric 318. Communications fabric 318 may be implemented with any architecture designed for passing data and/or control information between processors (such as microprocessors, communications and network processors, etc.), system memory, peripheral devices, and any other hardware components within a system.

Server 110 and client device 130 may include one or more operating systems 310, and one or more application programs 311, for example, user application 140, are stored on one or more of the computer readable storage media 308 for execution by one or more of the processors 302 via one or more of the respective RAMs 304 (which typically include cache memory). In the illustrated embodiment, each of the computer readable storage media 308 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 and client device 130 may also include a R/W drive or interface 314 to read from and write to one or more portable computer readable storage media 326. Application programs 311 on server 110 and client device 130 may be stored on one or more of the portable computer readable storage media 326, read via the respective R/W drive or interface 314 and loaded into the respective computer readable storage media 308.

Server 110 and client device 130 may also include a network adapter or interface 316, such as a TCP/IP adapter card or wireless communication adapter (such as a 4G wireless communication adapter using OFDMA technology) for connection to a network 317 or AV receiver 328. Application programs 311 on server 110 and client device 130 may be downloaded to a computing device, for example, server 110, from an external computer or external storage device via a network (for example, the Internet, a local area network or other wide area network or wireless network) and network adapter or interface 316. From the network adapter or interface 316, the programs may be loaded onto computer readable storage media 308. The network may comprise copper wires, optical fibers, wireless transmission, routers, firewalls, switches, gateway computers and/or edge servers.

Server 110 and client device 130 may also include a display screen 320, a keyboard or keypad 322, and a computer mouse or touchpad 324. Device drivers 312 interface to display screen 320 for imaging, to keyboard or keypad 322, to computer mouse or touchpad 324, and/or to display screen 320 for pressure sensing of alphanumeric character entry and user selections. The device drivers 312, R/W drive or interface 314 and network adapter or interface 316 may comprise hardware and software (stored on computer readable storage media 308 and/or ROM 306).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for audio and video synchronization, the method comprising:
    receiving, on a computer system, a plurality of audio data streams;
    receiving, on the computer system, a plurality of video data streams;
    synchronizing a selected video data stream of the received plurality of video data streams and a selected audio data stream of the received plurality of audio data streams, in response to receiving a user selection input, wherein the user selection comprises a video stream selection and an audio stream selection, based on the received plurality of audio data streams and the received plurality of video data streams;
    monitoring the synchronized video data stream and audio data stream, the monitoring occurring periodically;
    in response to the monitored video data stream and audio data stream not being synchronized, communicating a time delay value option to a user for display;
    receiving a time delay value selection based on the time delay value option;
    generating a synchronization time delay based on the received time delay value selection;
    indexing the synchronized video data stream and audio data stream in a data store, based on a synchronization determination of the monitored synchronized video data stream and audio data stream, wherein the indexed synchronized video data stream and audio data stream includes, at least the video stream selection, the audio stream selection, and the time delay value selection;
    in response to receiving a second user selection input of a second selected audio data stream of the plurality of audio data streams, wherein the second user selection input is communicated via a social network, querying the indexed synchronized video data stream, audio data stream, and time delay value selection; and
    synchronizing the selected video data stream and the second selected audio data stream based on the queried index.

2. The method of claim 1, further comprising:
    calculating a time delay value based on the monitored synchronized video data stream and audio data stream.

3. The method of claim 1, wherein synchronizing further comprises one or more of:
    delaying the selected audio data stream;
    delaying the selected video data stream;
    synchronizing the selected audio data stream and selected video data stream based on Moving Picture Experts Group (MPEG) formatted encrypted transport stream;
    synchronizing the selected audio data stream and selected video data stream based on waveform analysis.

4. The method of claim 1, wherein index synchronization is communicated via the social network.

5. The method of claim 1, wherein the received plurality of video data streams are one or more of: digital; and analog.

6. The method of claim 1, wherein the received plurality of audio data streams are one or more of: digital; and analog.

7. A computer program product for audio and video synchronization, the computer program product comprising:
    a computer-readable storage media having program instructions stored on the computer-readable storage media, the program instructions, executable by a device, comprising:
        instructions to receive, on a computer system, a plurality of audio data streams;
        instructions to receive, on the computer system, a plurality of video data streams;
        instructions to synchronize a selected video data stream of the received plurality of video data streams and a selected audio data stream of the received plurality of audio data streams, in response to receiving a user selection input, wherein the user selection comprises a video stream selection and an audio stream selection, based on the received plurality of audio data streams and the received plurality of video data streams;

instructions to monitor the synchronized video data stream and audio data stream, the monitoring occurring periodically;

in response to the monitored video data stream and audio data stream not being synchronized, instructions to communicate a time delay value option to a user for display;

instructions to receive a time delay value selection based on the time delay value option;

instructions to generate a synchronization time delay based on the received time delay value selection;

instructions to index the synchronized video data stream and audio data stream in a data store, based on a synchronization determination of the monitored synchronized video data stream and audio data stream, wherein the indexed synchronized video data stream and audio data stream includes, at least the video stream selection, the audio stream selection, and the time delay value selection;

in response to, instructions to receive a second user selection input of a second selected audio data stream of the plurality of audio data streams, wherein the second user selection input is communicated via a social network, querying the indexed synchronized video data stream, audio data stream, and time delay value selection; and instructions to synchronize the selected video data stream and the second selected audio data stream; stream, based on the queried index.

8. The computer program product of claim 7, further comprising:

instructions to calculate a time delay value based on the monitored synchronized video data stream and audio data stream.

9. The computer program product of claim 7, wherein synchronizing further comprises one or more of:

instructions to delay the selected audio data stream;
instructions to delay the selected video data stream;
instructions to synchronize the selected audio data stream and selected video data stream based on waveform analysis.

10. The computer program product of claim 7, wherein index synchronization is communicated via the social network.

11. The computer program product of claim 7, wherein the received plurality of video data streams are one or more of: digital; and analog.

12. The computer program product of claim 7, wherein the received plurality of audio data streams are one or more of: digital; and analog.

13. A computer system for audio and video synchronization, the computer system comprising:

one or more computer processors;
one or more computer-readable storage media;
program instructions stored on the computer-readable storage media for execution by at least one of the one or more processors, the program instructions comprising:

instructions to receive, on a computer system, a plurality of audio data streams;

instructions to receive, on the computer system, a plurality of video data streams;

instructions to synchronize a selected video data stream of the received plurality of video data streams and a selected audio data stream of the received plurality of audio streams, in response to receiving a user selection input, wherein the user selection comprises a video stream selection and an audio stream selection, based on the received plurality of audio data streams and the received plurality of video data streams;

instructions to monitor the synchronized video data stream and audio data stream, the monitoring occurring periodically;

in response to the monitored video data stream and audio data stream not being synchronized, instructions to communicate a time delay value option to a user for display;

instructions to receive a time delay value selection based on the time delay value option;

instructions to generate a synchronization time delay based on the received time delay value selection;

instructions to index the synchronized video data stream and audio data stream in a data store, based on a synchronization determination of the monitored synchronized video data stream and audio data stream, wherein the indexed synchronized video data stream and audio data stream includes, at least the video stream selection, the audio stream selection, and the time delay value selection;

in response to, instructions to receive a second user selection input of a second selected audio data stream of the plurality of audio data streams, wherein the second user selection input is communicated via a social network, querying the indexed synchronized video data stream, audio data stream, and time delay value selection; and instructions to synchronize the selected video data stream and the second selected audio data stream, based on the queried index.

14. The system of claim 13, further comprising:

instructions to calculate a time delay value based on the monitored synchronized video data stream and audio data stream.

15. The system of claim 13, wherein synchronizing further comprises one or more of:

instructions to delay the selected audio data stream;
instructions to delay the selected video data stream;
instructions to synchronize the selected audio data stream and selected video data stream based on Moving Picture Experts Group (MPEG) formatted encrypted transport stream;
instructions to synchronize the selected audio data stream and selected video data stream based on waveform analysis.

16. The system of claim 13, wherein index synchronization is communicated via the social network.

17. The system of claim 13, wherein the received plurality of audio data streams are one or more of: digital; and analog.

* * * * *